(12) United States Patent
Davy

(10) Patent No.: US 6,776,700 B2
(45) Date of Patent: Aug. 17, 2004

(54) PROCESSING OF MOLLUSCS

(75) Inventor: Peter Davy, Canterbury (GB)

(73) Assignee: Stevedore & Fishery Services Limited (FK)

(*) Notice: Subject to any disclaimer, the term of this patent is extended or adjusted under 35 U.S.C. 154(b) by 0 days.

(21) Appl. No.: 10/392,051

(22) Filed: Mar. 19, 2003

(65) Prior Publication Data
US 2003/0224709 A1 Dec. 4, 2003

Related U.S. Application Data

(63) Continuation of application No. PCT/GB01/04209, filed on Sep. 20, 2001.

(30) Foreign Application Priority Data

Sep. 21, 2000 (GB) .............................................. 0023190

(51) Int. Cl.$^7$ ............................................... A22C 29/04
(52) U.S. Cl. ...................................................... 452/12
(58) Field of Search ............................... 452/1, 10, 12, 452/18

(56) References Cited

U.S. PATENT DOCUMENTS

| 1,175,037 A | * 3/1916 | Yancey ......................... 452/10 |
| 1,520,190 A | * 12/1924 | Lieberman .................... 452/10 |
| 1,655,583 A | 1/1928 | Umrath ......................... 452/10 |
| 2,104,027 A | * 1/1938 | Dubus ........................... 452/10 |
| 2,771,630 A | * 11/1956 | Hiller ............................ 452/10 |
| 3,229,325 A | 1/1966 | Amelang ....................... 452/10 |
| 3,597,792 A | 8/1971 | Lockerby ...................... 452/10 |
| 4,663,805 A | 5/1987 | Adcock ......................... 452/10 |
| 5,011,453 A | * 4/1991 | Lapeyre et al. ............... 452/10 |

* cited by examiner

Primary Examiner—Charles T. Jordan
Assistant Examiner—Judith A. Nelson
(74) Attorney, Agent, or Firm—Gauthier & Connors LLP

(57) ABSTRACT

A method of gutting a cephalopod, such as squid, the cephalopod having an outer mantle containing internal organs, and the method comprising retaining the outer mantle at a fixed distance from a central axis while rotating the mantle about the said axis whereby the internal organs are subjected to a centrifugal force sufficient to eject the organs outwardly through an open end of the mantle.

16 Claims, 2 Drawing Sheets

PROCESSING OF MOLLUSCS

This is a continuation of International Patent Application No. PCT/GB01/04209, filed Sep. 20, 2001 which claims priority to British Patent Application No. 0023190.2, both of which are hereby incorporated by reference in their entirety.

This invention relates to the processing of molluscs, particularly cephalopods such as squid.

The squid comprises a tapered outer mantle within which are the body organs. The mantle is open at one end and tapers toward a small orifice at the other end, the wings or fins being located on either side of the mantle toward the tapered end, and the head and tentacles protruding from the open end where the mantle is at its widest. A cartiligenous backbone or 'pen' on the inside of the mantle provides rigidity and support.

Although squid can be eaten whole, initial preparation for human consumption normally involves removal of the internal organs and separation of the front part of the head and tentacles. The wings and 'pen' are also removed as well as the 'beak' or mouth. The tapered mantle may also be turned inside out to assist cleaning, and at some point the squid must be skinned. The edible empty mantle, tentacles, head and wings are then used to make a variety of edible food products.

The present invention is particularly concerned with the initial removal of the internal organs from the mantle i.e. with the gutting of the squid. At present squid are usually gutted by hand, large tough squid with the aid of a hook and small squid using a finger. The resulting partially gutted squid are then turned inside out by pushing the tapered end of the mantle down over a stick or post and then cleaning the remnants from the inside surface of the mantle.

In one alternative gutting process, a pressure-applying roller system forces most but not all of the guts out of the wide end of the mantle tube.

The known processes for gutting and cleaning squid are therefore generally laborious and have low productivity.

According to the present invention there is provided a method of gutting cephalopods, such as squid, wherein the internal organs are contained within an outer mantle open at one end, and wherein the mantle is retained at a fixed distance from a central axis while being rotated about the said axis whereby the internal organs are subjected to a centrifugal force sufficient to eject the organs outwardly through the open end of the mantle.

Preferably the outer mantle is retained by suction in a holding device while being rotated about the central axis. The holding device may comprise an air permeable container or pod disposed in a chamber, the chamber being evacuated such that the mantle is retained by suction in the container or pod when the chamber is rotated about the central axis.

In one embodiment of the invention the chamber comprises a drum and a plurality of containers or pods are angularly spaced around the periphery of the drum. Means are then provided for evacuating the drum while rotating it about the central axis.

In one alternative embodiment, the holding device consists of an open-ended tube or duct shaped at one end to receive the mantle, the other end of the tube or duct communicating with a vacuum device. In this embodiment a plurality of the tubes or ducts may be angularly spaced around the central axis, the inner ends of the tubes or ducts communicating with the vacuum device.

By way of example only, a squid gutting process embodying the invention will now be described with reference to the accompanying drawings wherein.

Referring to these drawings, the periphery of a processing drum 10 has a pattern of openings 15 for receiving tapered pods 11 such that the pods protrude inwardly from the periphery toward a central horizontal axis of the drum. The wider end of each pod lies flush with the surface of the drum and the drum is provided with respective covers (not shown) to seal each of the openings 15.

Figure 2A:
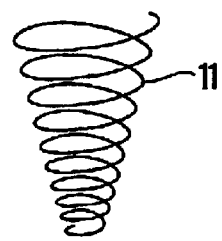
FIG. 2 illustrates various forms of pod which may be used with the drum of FIG. 1.
Figure 2B:
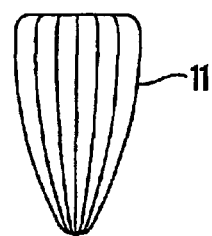
Figure 2C:
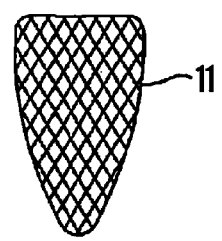

Each tapered pod 11 consists of an air permeable metal structure and may comprise, for example, coils of wire (FIG. 2a), lengths of wire (FIG. 2b) or wire mesh (FIG. 2c).

The drum 10 is freely rotatable about the central horizontal axis and is driven from a motor drive unit 12 at one end. A pipe 13 enters the drum along the horizontal axis and is connected to a vacuum pump (not shown).

In use, the drum 10 is first evacuated with the pods 11 empty and the covers closed. Squid are then progressively loaded into the pods 11 and automatically seal the openings 15 in the drum so that the vacuum is maintained.

The drum 10 is then rotated by the motor drive unit 12. This exerts a centrifugal force on the squid while the vacuum holds the tapered outer mantle 21 (FIG. 3) of the squid against the inside surface of the pods 11. Accordingly the internal organs of the squid are separated from the inside surface of the mantle and are ejected outwardly through the wider open end of the mantle 21 which lies flush-with the periphery of the drum.

Figure 3:
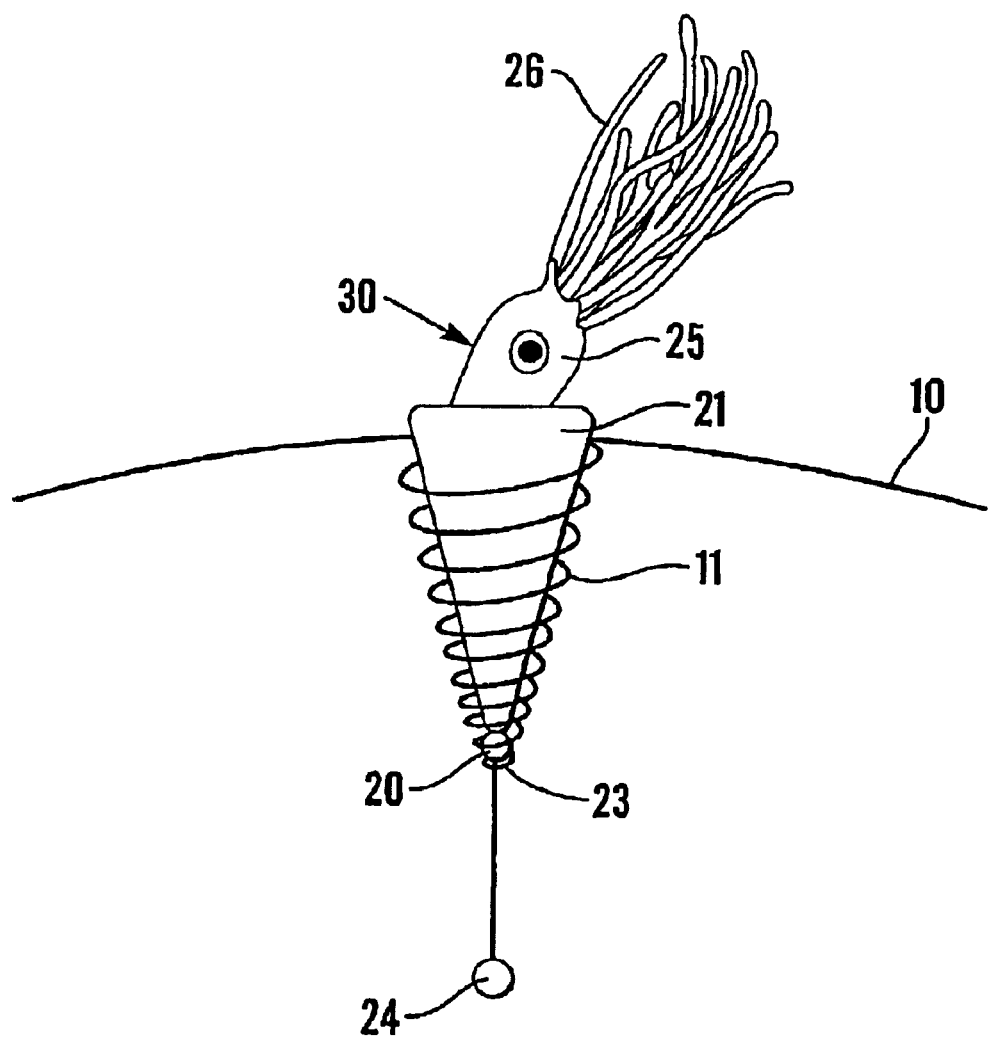
FIG. 3 illustrates a pod containing a squid.

As shown in FIG. 3, a small weight 20 can be located inside the bottom end of the pod 11 between an opening 23 at the bottom of the pod and an orifice (not shown) at the tapered bottom end of the mantle 21 of a squid. The size and shape of the weight 20 is such that it cannot pass through either the opening 23 or the orifice at the bottom end of the mantle 21. Accordingly, as the internal organs are ejected from the mantle 21, the effect of the centrifugal force on the weight 20 is to push the narrow tapered end of the mantle up through the mantle, peeling the mantle away from the inside surface of the pod 11 and turning the mantle inside out as it is ejected. This assists subsequent cleaning of the mantle, and/or further preparation of the final edible product. The weight 20 may be linked through the bottom opening 23 of the pod 11 to an end-stop 24 which cannot pass through the opening 23 and therefore prevents the weight itself being ejected from the pod after ejecting the mantle.

Also as shown in FIG. 3, the head 25 and tentacles 26 of the squad 30 may be saparated from the mantle 21 and ejected in the same manner as the internal organs i.e. by centrifugal force. Alternatively, since the head 25 and the tentacles 26 protrude from pod 11, the head and tentacles can be manually or mechanically separated from the break and internal organs.

After ejecting the internal organs, the mantle may be manually or mechanically stuffed with edible product before being ejected from the pod by rotating the drum without applying the vacuum.

Figure 1:
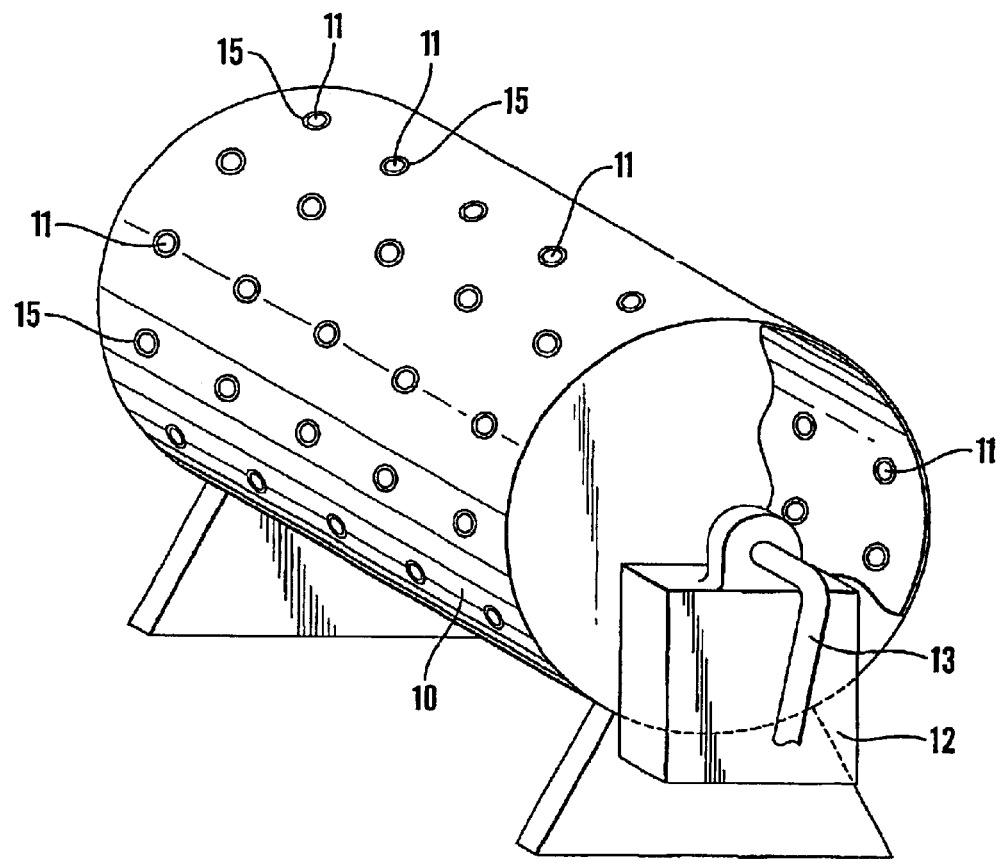
FIG. 1 is a diagrammatic sketch of a processing drum.

In one alternative embodiment (not illustrated), the drum 10 is solid and includes a plurality of radially-extending openings that each communicate with a central axially-extending duct connected to the pipe 13, the radially-extending openings corresponding to the openings 15 in the embodiment of FIG. 1 and being shaped to directly receive the mantle of the squid rather than receiving a pod for holding the mantle. With this arrangement, after the internal organs, head and tentacles have been ejected, the vacuum applied to the mantle may be sufficient to draw the mantle in a reverse direction through a narrow section of the radially-extending opening to skin the mantle. This provides total separation of the edible product and waste material.

What is claimed is:

1. A method of gutting a cephalopod, the cephalopod having an edible outer mantle containing inedible internal organs, and the method comprising retaining the outer mantle by suction in a holding device at a fixed distance from a central axis while rotating the holding device about said axis at a speed such that the internal organs are subjected to a centrifugal force sufficient to eject the internal organs outwardly through an open end of the mantle.

2. A method according to claim 1 wherein the holding device comprises an air-permeable container or pod disposed in a chamber, the chamber being evacuated such that the mantle is retained by suction in the container or pod when the internal organs are subjected to the said centrifugal force.

3. A method according to claim 2 wherein the chamber comprises a drum and a plurality of the said containers or pods are angularly spaced around the periphery of the drum.

4. A method according to claim 1 wherein the holding device comprises an open-ended tube or duct shaped at one end to receive the mantle, and wherein suction is applied at the other end of the tube or duct to retain the mantle in the tube or duct while the tube or duct is rotated about the central axis.

5. Apparatus for gutting a cephalopod, wherein the cephalopod has an edible outer mantle containing inedible internal organs, the apparatus comprising a holding device for holding the mantle at a fixed distance from a central axis; means for retaining the mantle in said holding device by suction; and means for rotating said holding device about said central axis at a speed such that the internal organs are subjected to a centrifugal force sufficient to eject the internal organs outwardly through an open end of the mantle.

6. Apparatus according to claim 5 wherein the holding device includes an air-permeable container or pod shaped to receive the mantle.

7. Apparatus according to claim 6 wherein the air-permeable container or pod comprises an open wire framework or wire mesh.

8. Apparatus according to claim 6 wherein the air-permeable container or pod is disposed in a chamber and the vacuum means evacuates the chamber.

9. Apparatus according to claim 8 wherein the chamber comprises a drum.

10. Apparatus according to claim 9 wherein a plurality of the containers or pods are angularly spaced around the periphery of the drum.

11. Apparatus according to claim 5 wherein the holding device comprises an open-ended tube or duct shaped at one end to receive the mantle, the other end of the tube or duct communicating with the vacuum means.

12. Apparatus according to claim 11 wherein a plurality of the tubes or ducts are angularly spaced around the central axis and extend radially therefrom.

13. Apparatus according to claim 12 wherein the radially-extending tubes or ducts are formed in a cylindrical drum and communicate with an axially-extending tube or duct connected to a vacuum source.

14. Apparatus according to claim 6 further comprising a body weight positioned between a narrow end of the mantle and a corresponding narrow end of the container or pod, the body weight being urged outwards by centrifugal force to peel the mantle away from an inside surface of the container or pod and to turn the mantle inside out after the internal organs have been ejected from the mantle.

15. A method according to claim 1, in the cephalopod is a squid.

16. A method according to claim 2, comprising providing a body weight positioned between a narrow end of the mantle and a corresponding narrow end of the container or pod, so that the body weight is urged outwards by centrifugal force to peel the mantle away from an inside surface of the container or pod and to turn the mantle inside out after the internal organs have been ejected from the mantle.

\* \* \* \* \*